United States Patent [15] 3,700,760
Benghiat [45] Oct. 24, 1972

[54] DIESTERS OF HALO-SUBSTITUTED ALKYLOXYALKYLPHOSPHONATES

[72] Inventor: Isaac Benghiat, New City, N.Y.

[73] Assignee: Universal Oil Products Company, Des Plains, Ill.

[22] Filed: Dec. 29, 1969

[21] Appl. No.: 888,966

[52] U.S. Cl..............260/950, 117/156, 260/45.7 R, 260/429.7, 260/612 D, 260/614 R, 260/969, 260/999
[51] Int. Cl. .........................C07f 7/40, D06c 27/00
[58] Field of Search........................260/950

[56] References Cited

FOREIGN PATENTS OR APPLICATIONS 515,706   8/1955   Canada......................260/950

OTHER PUBLICATIONS

Index Chemieus, Vol. 28, No. 7, Feb. 2, 1968, Item No. 91161.

Primary Examiner—Joseph Rebold
Assistant Examiner—Anton H. Sutto
Attorney—James R. Hoatson, Jr. and Raymond H. Nelson

[57] ABSTRACT

Novel compositions of matter comprising diesters of halo-substituted alkyloxyalkylphosphonates containing at least two halogen atoms as exemplified by dimethyl 3-chloro-2,3-dibromopropoxymethylphosphonates are utilized as components in preparing compounds such as plastics, polymers, resins, etc. and will impart desirable physical characteristics of flame retardance or fire resistance to these compounds.

6 Claims, No Drawings

DIESTERS OF HALO-SUBSTITUTED ALKYLOXYALKYLPHOSPHONATES

This invention relates to novel compositions of matter comprising diesters of halo-substituted alkyloxyalkylphosphonates. More specifically, the invention is concerned with these novel compounds which are alkyl diesters of halo-substituted alkyloxyalkylphosphonates which contain at least two halogen atoms and to their use thereof as components of finished compositions of matter which possess a high degree of flame retardancy.

It has now been discovered that the flame retardancy or fire resistance of many compounds such as polymers may be enhanced by the addition of a diester of a halo-substituted alkyloxyalkylphosphonate which contains at least two halogen atoms. Some examples of compounds which may be admixed with the phosphonate of the type hereinafter set forth in greater detail will include plastics, polymers, resins as well as naturally occurring textiles and fibers, specific examples of these compounds including polyolefins such as polyethylene, polypropylene, polystyrene and copolymers thereof, polyesters, polyurethanes, polyphenyl ethers such as polyphenylene oxides, polycarbonates, polyamides, polyoxymethylenes, polyalkylene oxides such as polyethylene oxide, polyacetals, polyacrylates, polymethacrylates, epoxy resins, copolymers or graft polymers of acrylonitrile with styrenic olefins such as acrylonitrile-butadiene-styrene formulations (commonly known as ABS), both naturally occurring and synthetic rubber such as polyisoprene, polybutadiene, EPR rubber, SBR rubber, textiles, fibers, fabrics, said textiles, fibers and fabrics being both naturally occurring and synthetic in nature, coatings, paints, varnishes, leathers, foam, etc. By combining these aforementioned compounds with a diester of a polyhalo-substituted alkylphosphonate of the type hereinafter set forth in greater detail, the compounds will possess the desirably physical characteristics of flame proofing or fire retardancy. These particular physical characteristics will possess special advantages when preparing plastics, polymers, resins, various rubbers, textiles, etc. which will be utilized in places which may be subjected to excessive heat or to the action of a possible flame, such places including architectural panels for construction work, wall plugs for electrical connections, soundproofing material in walls, ceilings, etc., cushions for various vehicle seats such as airplane seats, automobile seats, bus seats, etc. In addition, the compound when utilized as a constituent of paint, lacquer, varnishes, or protective coatings, films, etc. will also impart a flame resistancy to these compounds and, therefore, render them commercially attractive as articles of commerce. In addition, it is also contemplated that the novel compositions of matter comprising a diester, and particularly a dialkyl ester of a halo-substituted alkyloxyalkylphosphonate containing at least two halogen atoms may also be useful as insecticides, and particularly against houseflies.

It is therefore an object of this invention to provide novel compositions of matter which possess desirable physical characteristics or properties.

Another object of this invention is to provide novel compositions of matter possessing these desirable physical characteristics of flameproofing and fire retardancy whereby said compositions of matter may be useful as components of finished important commercial articles of manufacture.

In one aspect an embodiment of this invention resides in a novel composition of matter comprising a diester of a halo-substituted alkyloxyalkylphosphonate containing at least two halogen atoms.

Another embodiment of this invention resides in a flame retardant composition of matter comprising a polymer and an effective concentration of a diester of a halo-substituted alkyloxyalkylphosphonate containing at least two halogen atoms.

A specific embodiment of this invention is found in a novel composition of matter comprising dimethyl 3-chloro-2,3-dibromopropoxymethylophosphonate.

Another specific embodiment of this invention is found in a flame retardant composition of matter comprising an admixture of a polyester and dimethyl 3-chloro-2,3-dibromopropoxymethylphosphonate.

Other objects and embodiments will be found in the following further detailed description of the present invention.

As hereinbefore set forth the present invention is concerned with novel compositions of matter which comprise diesters, and particularly dialkyl esters of halo-substituted alkyloxyalkylphosphonates containing at least two halogen atoms. The aforementioned novel compositions of matter will possess the generic formula:

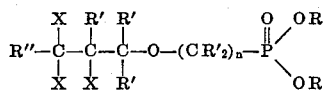

in which X is hydrogen or halogen atoms, preferably chlorine or bromine, R is an alkyl radical of from one to about five carbon atoms, R' and R'' are independently selected from the group consisting of hydrogen, halogen, lower alkyl of from one to five carbon atoms, cycloalkyl, aryl, aralkyl, alkaryl and halogenated derivatives thereof, and $n$ is an integer of from one to five, there being at least two halogen atoms in said compound.

Some representative specific examples of the novel compositions of matter of the present invention which possess the generic formula hereinbefore set forth will include dimethyl 2-chloro-2,3-dibromopropoxymethylphosphonate, dimethyl 3-chloro-2,3-dibromopropoxymethylphosphonate, dimethyl 2,3-dichloropropoxymethylphosphonate, dimethyl 2,3-dibromopropoxymethylphosphonate, dimethyl 3-cyclohexyl-3-chloro-2,3-dibromopropoxymethylphosphonate, dimethyl 3-cyclohexyl-2,3-dichloropropoxymethylphosphonate, dimethyl 3-cyclohexyl-2,3-dibromopropoxymethylphosphonate, dimethyl 3-phenyl-2,3-dichloropropoxymethylphosphonate, dimethyl 3-phenyl-2,3-dibromopropoxymethylphosphonate, dimethyl 3-(p-tolyl)-2,3-dichloropropoxymethylphosphonate, dimethyl 3-(p-tolyl)-2,3-dibromopropoxymethylphosphonate, dimethyl 2,3-dichlorobutoxymethylphosphonate, dimethyl 2,3-dibromobutoxymethylphosphonate, dimethyl 4-phenyl-3,4-dichlorobutoxymethylphosphonate, dimethyl 4-(p-tolyl)-2,3-dichlorobutoxymethylphosphonate, dimethyl 4-phenyl-4-chloro-3,4-dibromobutoxymethylphosphonate, diethyl 2-chloro-2,3-dibromopropoxymethylphosphonate, diethyl 3-chloro-2,3-dibromopropoxymethylphosphonate, diethyl 2,3-dichloropropoxymethylphosphonate, diethyl 2,3-dibromopropoxymethylphosphonate, diethyl 3-cyclohexyl-3-chloro-2,3-dibromopropoxymethylphosphonate, diethyl 3-cyclohexyl-2,3-dichloropropoxymethylphosphonate, diethyl 3-cyclohexyl-2,3-dibromopropoxymethylphosphonate, diethyl 3-phenyl-2,3-dichloropropoxymethylphosphonate, diethyl 3-phenyl-2,3-dibromopropoxymethylphosphonate, diethyl 3-(p-tolyl)-2,3-dichloropropoxymethylphosphonate, diethyl 3-(p-tolyl)-2,3d-dibromopropoxymethylphosphonate, diethyl 2,3-dichlorobutoxymethylphosphonate, diethyl 2,3-dibromobutoxymethylphosphonate, diethyl 4-phenyl-3,4-dichlorobutoxymethylphosphonate, diethyl 4-(p-tolyl)-2,3d-dichlorobutoxymethylphosphonate, diethyl 4-phenyl-4-chloro-3,4-dibromobutoxymethylphosphonate, dipropyl 2-chloro-2,3-dibromopropoxymethylphosphonate, dipropyl 3-chloro-2,3-dibromopropoxymethylphosphonate, dipropyl 2,3-dichloropropoxymethylphosphonate, dipropyl 2,3-dibromopropoxymethylphosphonate, dipropyl 3-cyclohexyl-3-chloro-2,3-dichloropropoxymethylphosphonate, dipropyl 3-cyclohexyl-2,3-dibromopropoxymethylphosphonate, dipropyl 3-phenyl-2,3-dichloropropoxymethylphosphonate, dipropyl 3-phenyl-2,3-dibromopropoxymethylphosphonate, dipropyl 3-(p-tolyl)-2,3-dichloropropoxymethylphosphonate, dipropyl 3-(p-tolyl)-2,3-dibromopropoxymethylphosphonate, dipropyl 2,3-dichlorobutoxymethylphosphonate, dipropyl 2,3-dibromobutoxymethylphosphonate, dipropyl 4-phenyl-3,4-dichlorobutoxymethylphosphonate, dipropyl 4-(p-tolyl)-2,3-dichlorobutoxymethylphosphonate, dipropyl 4-phenyl-4-chloro-3,4-dibromobutoxymethylphosphonate, dibutyl 2-chloro-2,3-dibromopropoxymethylphosphonate, dibutyl 3-chloro-2,3-dibromopropoxymethylphosphonate, dibutyl 2,3-dichloropropoxymethylphosphonate, dibutyl 2,3-dibromopropoxymethylphosphonate, dibutyl 3-cyclohexyl-3-chloro-2,3-dibromopropoxymethylphosphonate, dibutyl 3-cyclohexyl-2,3-dichloropropoxymethylphosphonate, dibutyl 3-cyclohexyl-2,3-dibromopropoxymethylphosphonate, dibutyl 3-phenyl-2,3-dichloropropoxymethylphosphonate, dibutyl 3-phenyl-2,3-dibromopropoxymethylphosphonate, dibutyl 3-(p-tolyl)-2,3-dichloropropoxymethylphosphonate, dibutyl 3-(p-tolyl)-2,3d-dibromopropoxymethylphosphonate, dibutyl 2,3-dichlorobutoxymethylphosphonate, dibutyl 2,3-dibromobutoxymethylphosphonate, dibutyl 4-phenyl-3,4-dichlorobutoxymethylphosphonate, dibutyl 4-(p-tolyl)-2,3d-dichlorobutoxymethylphosphonate, dibutyl 4-phenyl-4-chloro-3,4-dibromobutoxymethylphosphonate, dimethyl 2-chloro-2,3-dibromopropoxyethylphosphonate, dimethyl 2,3-dichloropropoxyethylphosphonate, dimethyl 3-cyclohexyl-3-chloro-2,3-dibromopropoxyethylphosphonate, dimethyl 3-cyclohexyl-2,3-dibromopropoxyethylphosphonate, dimethyl 3-phenyl-2,3-dibromopropoxyethylphosphonate, dimethyl 3-(p-tolyl)-2,3-dibromopropoxyethylphosphonate, dimethyl 2,3-dibromobutoxyethylphosphonate, dimethyl 4-(p-tolyl)-2,3-dichlorobutoxyethylphosphonate, diethyl 2-chloro-2,3-dibromopropoxyethylphosphonate, diethyl 2,3-dichloropropoxymethylphosphonate, diethyl 3-cyclohexyl-3-chloro-2,3-dibromopropoxyethylphosphonate, diethyl 3-cyclohexyl-2,3-dibromopropoxyethylphosphonate, diethyl 3-cyclohexyl-2,3-dibromopropoxyethylphosphonate, diethyl 3-phenyl-2,3-dibromopropoxyethylphosphonate, diethyl 3-(p-tolyl)-2,3-dibromopropoxyethylphosphonate, diethyl 2,3-dibromobutoxyethylphosphonate, diethyl 4-(-tolyl)-2,3-dichlorobutoxyethylphosphonate, dipropyl 2-chloro-2,3-dibromopropoxyethylphosphonate, dipropyl 2,3-dichloropropoxyethylphosphonate, dipropyl 3-cyclohexyl-3-chloro-2,3-dibromopropoxyethylphosphonate, dipropyl 3-cyclohexyl-2,3-dibromopropoxyethylphosphonate, dipropyl 3-phenyl-2,3-dibromopropoxyethylphosphonate, dipropyl 3-(p-tolyl)-2,3-dibromopropoxyethylphosphonate, dipropyl 2,3-dibromobutoxyethylphosphonate, dipropyl 4-(p-tolyl)-2,3-dichlorobutoxyethylphosphonate, dibutyl 2-chloro-2,3-dibromopropoxyethylphosphonate, dibutyl 2,3-dichloropropoxyethylphosphonate, dibutyl 3-cyclohexyl-3-chloro-2,3-dibromopropoxyethylphosphonate, dibutyl 3-cyclohexyl-2,3-dibromopropoxyethylphosphonate, dibutyl 3-phenyl-2,3-dibromopropoxyethylphosphonate, dibutyl 3-(p-tolyl)-2,3-dibromopropoxyethylphosphonate, dibutyl 2,3-dibromobutoxyethylphosphonate, dibutyl 4-(p-tolyl)-2,3-dichlorobutoxyethylphosphonate, dimethyl 3-chloro-2,3-dibromopropoxypropylphosphonate, dimethyl 2,3-dibromopropoxypropylphosphonate, dimethyl 3-cyclohexyl-2,3-dichloropropoxypropylphosphonate, dimethyl 3-phenyl-2,3-dichloropropoxypropylphosphonate, dimethyl 3-(p-tolyl)-2,3-dichloropropoxypropylphosphonate, dimethyl 2,3-dichlorobutoxypropylphosphonate, dimethyl 4-phenyl-3,4-dichlorobutoxypropylphosphonate, dimethyl-4-phenyl-4-chloro-3,4-dibromobutoxypropylphosphonate, diethyl 3-chloro-2,3-dibromopropoxypropylphosphonate, diethyl 2,3-dibromopropoxypropylphosphonate, diethyl 3-cyclohexyl-2,3-dichloropropoxypropylphosphonate, diethyl 3-phenyl-2,3-dichloropropoxypropylphosphonate, diethyl 3-(p-tolyl)-2,3-dichloropropoxypropylphosphonate, diethyl 2,3-dichlorobutoxypropylphosphonate, diethyl 4-phenyl-3,4-dichlorobutoxypropylphosphonate, diethyl-4-phenyl-4-chloro-3,4-dibromobutoxypropylphosphonate, dipropyl 3-chloro-2,3-dibromopropoxypropylphosphonate, dipropyl 2,3-dibromopropoxypropylphosphonate, dipropyl 3-cyclohexyl-2,3-dichloropropoxypropylphosphonate, dipropyl 3-phenyl-2,3-dichloropropoxypropylphosphonate, dipropyl 3-(p-tolyl)-2,3-dichloropropoxypropylphosphonate, dipropyl 2,3-dichlorobutoxypropylphosphonate, dipropyl 4-phenyl-3,4-dichlorobutoxypropylphosphonate, dipropyl 4-phenyl-4-chloro-3,4-dibromobutoxypropylphosphonate, dibutyl 3-chloro-2,3-dibromopropoxypropylphosphonate, dibutyl 2,3-dibromopropoxypropylphosphonate, dibutyl 3-cyclohexyl-2,3-dichloropropoxypropylphosphonate, dibutyl 3-phenyl-2,3-dichloropropoxypropylphosphonate, dibutyl 3-(p-tolyl)-2,3-dichloropropoxypropylphosphonate, dibutyl 2,3-dichlorobutoxypropylphosphonate, dibutyl 4-phenyl-3,4-dichlorobutoxypropylphosphonate, dibutyl 4-phenyl-4-chloro-3,4-dibromobutoxypropylphosphonate, the corresponding diethyl-, dipropyl, dibutyl-, and dimethyl- of the corresponding halo-substituted phosphonates, etc. It is to be understood that the aforementioned compounds are only representative of the novel compositions of matter, and that the present invention is not necessarily limited thereto.

The novel compositions of matter of the type hereinbefore set forth may be prepared by reacting an alkenyloxyalkyl halide with a trialkyl phosphite in the presence of an organic solvent at condensation conditions. For the purposes of this invention the halide compound will be defined as a compound in which the alkenyl portion of the compound will contain an ethylenic unsaturation and may, if so desired, also contain halogen substituents, said halogen substituents being either chlorine or bromine. The aforementioned condensation conditions will include a temperature in the range of from about 100°C. to about 200°C., and preferably at the reflux temperature of the particular solvent if one is employed in the reaction. Generally speaking, the reaction may be effected at pressures ranging from atmospheric up to about 50 atmospheres or more, the preferred pressure being atmospheric. Some specific examples of alkenyloxyalkyl halides which may be condensed with a trialkyl phosphite will include allyloxymethyl chloride, propenyloxymethyl chloride, 2-chloroallyloxymethyl chloride, 3-chloroallyloxymethyl chloride, 2-bromoallyloxymethyl chloride, 3-bromoallyloxymethyl chloride, 2-chloropropenyloxymethyl chloride, butenyloxymethyl chloride, 3-chlorobutenyloxymethyl chloride, 3-bromobutenyloxymethyl chloride, 3-phenylallyloxymethyl chloride, 3-cyclohexylallyloxymethyl chloride, 3-p-tolyl-allyloxymethyl chloride, 3-phenyl-2-chloroallyloxymethyl chloride, 3-phenyl-2-bromoallyloxymethyl chloride, allyloxyethyl chloride, propenyloxyethyl chloride, 2-chloroallyloxyethyl chloride, 3-chloroallyloxyethyl chloride, 2-bromoallyloxyethyl chloride, 3-bromoallyloxyethyl chloride, 2-chloropropenyloxyethyl chloride, butenyloxyethyl chloride, 3-chlorobutenyloxyethyl chloride, 3-bromobutenyloxyethyl chloride, 3-phenylallyloxyethyl chloride, 3-cyclohexylallyloxyethyl chloride, 3-p-tolylallyloxyethyl chloride, 3-phenyl-2-chloroallyloxyethyl chloride, 3-phenyl-2-bromoallyloxyethyl chloride, allyloxypropyl chloride, propenyloxypropyl chloride, 2-chloroallyloxypropyl chloride, 3-chloroallyloxypropyl chloride, 2bromoallyloxypropyl chloride, 3-bromoallyloxypropyl chloride, 2-chloropropenyloxypropyl chloride, butenyloxypropyl chloride, 3-chlorobutenyloxypropyl chloride, 3-bromobutenyloxypropyl chloride, 3-phenylallyloxypropyl chloride, 3-cyclohexylallyloxypropyl chloride, 3-p-tolylallyloxypropyl chloride, 3-phenyl- 2-chloroallyloxypropyl chloride, 3-phenyl-2-bromoallyloxypropyl chloride, allyloxybutyl chloride, propenyloxybutyl chloride, 2-chloroallyloxybutyl chloride, 3-chloroallyloxybutyl chloride, 2-bromoallyloxybutyl chloride, 3-bromoallyloxybutyl chloride, 2-chloropropenyloxybutyl chloride, butenyloxybutyl chloride, 3-chlorobutenyloxybutyl chloride, 3-bromobutenyloxybutyl chloride, 3-phenylallyloxybutyl chloride, 3-cyclohexylallyloxybutyl chloride, 3-p-tolylallyloxybutyl chloride, 3-phenyl-2-chloroallyloxybutyl chloride, 3-phenyl-2-bromoallyloxybutyl chloride, allyloxypentyl chloride, propenyloxypentyl chloride, 2-chloroallyloxypentyl chloride, 3-chloroallyloxypentyl chloride, 2-bromoallyloxypentyl chloride, 3-bromoallyloxypentyl chloride, 2-chloropropenyloxypentyl chloride, butenyloxypentyl chloride, 3-chlorobutenyloxypentyl chloride, 3-bromobutenyloxypentyl chloride, 3-phenylallyloxypentyl chloride, 3-cyclohexylallyloxypentyl chloride, 3-p-tolylallyloxypentyl chloride, 3-phenyl-2-chloroallyloxypentyl chloride, 3-phenyl-2-bromoallyloxypentyl chloride, etc.

The aforementioned alkenyloxyalkyl halides are condensed with alkyl phosphites in which the alkyl substituent may contain from one to about five carbon atoms. Specific examples of these compounds will include trimethylphosphite, triethylphosphite, tripropylphosphite, triisopropylphosphite, tributylphosphite, tri-t-butylphosphite, triamylphosphite, tri-sec-amylphosphite, etc. It is to be understood that the aforementioned specific examples of the alkenyloxyalkyl halides and alkyl phosphites are only representative of the class of compounds which may be used, and that the present invention is not necessarily limited thereto.

The condensation of the two reactants is effected at condensation conditions within the range hereinbefore set forth in the presence of a substantially inert organic solvent, if one is employed in the reaction. Some specific examples of these organic solvents which may be used, if so desired, will include dimethylformamide, diethylformamide, dipropylformamide, dimethylacetamide, diethylacetamide, dipropylacetamide, etc. It is also contemplated that other solvents such as alcohols include methyl alcohol, ethyl alcohol, n-propyl alcohol, isopropyl alcohol, etc.; aromatic solvents such as benzene, toluene, xylenes, ethylbenzene, etc.; paraffinic solvents such as n-heptane, n-hexane, cyclopentane, methylcyclopentane, cyclohexane, etc., or simple ethers such as dimethyl ether, diethyl ether, dipropyl ether may also be used at elevated pressures although not necessarily with equivalent results.

The compound which results from the condensation of the alkenyloxyalkyl halide and the trialkyl phosphite which comprises a dialkyl ester of an alkenyloxyalkylphosphonate is then subjected to a halogenation step by treating said phosphonate with a chlorinating agent or a brominating agent comprising hydrogen bromide, elemental bromine, hydrogen chloride or elemental chlorine in the presence of an organic solvent at halogenation conditions. These halogen conditions will include a temperature ranging from about 0°C. up to about 150°C. or more, the preferred temperature being that of the reflux temperature of the particular solvent which is employed in the reaction at atmospheric pressure. Upon completion of the addition of the halogenating agent the solvent which is employed in the process is removed by conventional means and the desired product is recovered. Examples of solvent which may be employed in the halogenation process will include halo-substituted alkanes such as chloroform, carbon tetrachloride, or aromatic solvents such as benzene, chlorobenzene, bromobenzene, etc.

The process for preparing the aforementioned novel compositions of matter may be effected in any suitable manner and may comprise either a batch or continuous type operation. For example, when a batch type operation is used a quantity of the starting materials comprising the alkenyloxyalkyl halide and the trialkyl phosphite are placed in an appropriate apparatus such as a flask provided with heating, stirring and reflux means. In addition, the flask will also contain the particular solvent which is to be employed. Generally speaking, the reactants are present in the reaction mixture in a molar ratio. The reactor is then heated to the desired operating temperature which, as hereinbefore set forth, preferably constitutes the reflux temperature of the particular solvent which is employed in the reaction. The condensation is allowed to proceed at reflux temperature for a predetermined period of time which may range from about 0.5 up to about 10 hours or more in duration, the end of the reaction being attained when there is a cessation of the evolution of alkyl chloride. The reaction mixture is recovered and subjected to fractional distillation whereby the desired product is separated from solvent, unreacted starting materials and/or unwanted side reactions which may have occurred during the condensation period.

The dialkyl ester of an alkenyloxyalkylphosphonate which constitutes the desired reaction product of the above condensation is then placed in a second reaction vessel also provided with heating or cooling, stirring and reflux means. In addition, the desired solvent of the type hereinbefore set forth is also present in this reactor. Following this the halogenating agent is slowly added to the reactor for a predetermined period of time and the reactor is heated to the reflux temperature of the particular solvent. It is contemplated within the scope of this invention that the halogenating agent, if in elemental form, may be added as a solution in the same solvent which is present in the reaction vessel. After the addition of the halogenating agent has been completed, usually in an equimolar amount to the dialkyl ester of an alkenyloxyalkylphosphonate which is present in the reactor, the reaction mixture is refluxed for an additional period, the total contact time ranging from 1 to about 10 hours or more in duration. Upon completion of the halogenation reaction heating is discontinued and the reaction mixture is recovered from the apparatus. This reaction mixture is then subjected to distillation whereby the solvent is separated and the desired product comprising the diester of the polyhalo-substituted alkyloxyalkylphosphonate.

It is also contemplated within the scope of this invention that the preparation of the desired novel compositions of matter may be accomplished by utilizing a continuous manner of operation, although not necessarily with equivalent results. When such a type of operation is used the starting materials comprising the alkenyloxyalkyl halide and the trialkyl phosphite are continuously charged to a reaction vessel which is maintained at the proper operating conditions of temperature and pressure. If so desired, the solvent in which the reaction is effected may be admixed with one or both of the starting materials prior to entry into said reactor or, in the alternative, said solvent may be charged to the reactor through a separate line. Upon completion of the desired residence time the reactor effluent is continuously withdrawn and subjected to separation means such as fractional distillation whereby the desired product comprising the diester of an alkenyloxyalkylphosphonate is separated from solvent and unreacted starting materials, the latter two being recycled to form a portion of the feed stock, while the former is charged to a second reaction vessel also maintained at the proper operating conditions of temperature and pressure. In this second reactor the halogenating agent is also continuously charged at a predetermined rate. In addition, the solvent in which the reaction is effected may be charged to the reactor through a separate line or admixed with the diester of the alkenyloxyalkylphosphonate prior to entry into said reactor and the resulting solution charged thereto through a single line. Upon completion of the desired residence time the reactor effluent from the second reactor is continuously discharged and again subjected to conventional separation means such as, for example, fractional distillation whereby the desired diester of the polyhalo-substituted alkyloxyalkylphosphonate is recovered while the solvent is recycled back to the second reactor.

It is also contemplated within the scope of this invention that the dialkyl esters of alkyloxyalkylphosphonates may be prepared by any other method which is known to one skilled in the art.

The aforementioned novel compositions of matter of the present invention are utilized, as hereinbefore set forth, as components in the preparation of finished compounds which will possess flame retardant or fire resistant properties, said dialkyl esters of polyhalo-substituted alkyloxyalkylphosphonates comprising from about 5 percent to about 50 percent of the finished product, the other component of the finished product comprising a polymeric substance. The desired finished products may be prepared in any suitable manner such as, for example, by admixing the compounds in a mixer, by milling the components or by extruding the component through a suitable apparatus after admixture thereof, the only criterion being that the two components of the mixture are thoroughly admixed in such a fashion so that the components are uniformly distributed throughout the finished product.

Some representative examples of the compounds comprising the finished product of the present invention will include polypropylene and dimethyl 2-chloro-2,3-dibromopropoxymethylphosphonate, ABS and dimethyl 2-chloro-2,3-dibromopropoxymethylphosphonate, polyethylene oxide and dimethyl 2-chloro-2,3-dibromopropoxymethylphosphonate, a polyester and dimethyl 2-chloro-2,3-dibromopropoxymethylphosphonate, polyethylene and dimethyl 2-chloro-2,3-dibromopropoxymethylphosphonate, polyurethane and dimethyl 2-chloro-2,3dibromopropoxymethylphosphonate, polyphenylene oxide and dimethyl 2-chloro-2,3-dibromopropoxymethylphosphonate, polypropylene and dimethyl 2,3-dichloropropoxymethylphosphonate, ABS and dimethyl 2,3-dichloropropoxymethylphosphonate, polyethylene oxide and dimethyl 2,3-dichloropropoxymethylphosphonate, a polyester and dimethyl 2,3-dichloropropoxymethylphosphonate, polyethylene and dimethyl 2,3-dichloropropoxymethylphosphonate, polyurethane and dimethyl 2,3-dichloropropoxymethylphosphonate, polyphenylene oxide and dimethyl 2,3-dichloropropoxymethylphosphonate, polypropylene and diethyl 3-chloro-2,3-dibromopropoxyethylphosphonate, ABS and diethyl 3-chloro-2,3-dibromopropoxyethylphosphonate, polyethylene oxide and diethyl 3-chloro-2,3-dibromopropoxyethylphosphonate, a polyester and diethyl 3-chloro-2,3-dibromopropoxyethylphosphonate, polyethylene and diethyl 3-chloro-2,3-dibromopropoxyethylphosphonate, polyurethane and diethyl 3-chloro-2,3-dibromopropoxyethylphosphonate, polyphenylene oxide and diethyl 3-chloro-2,3-dibromopropoxyethylphosphonate, polypropylene and dipropyl 2,3-dibromobutoxyethylphosphonate, ABS and dipropyl 2,3-dibromobutoxyethylphosphonate, polyethylene oxide and dipropyl 2,3-dibromobutoxyethylphosphonate, a polyester and dipropyl 2,3-dibromobutoxyethylphosphonate, polyethylene and dipropyl 2,3-dibromobutoxyethylphosphonate, polyurethane and dipropyl 2,3-dibromobutoxyethylphosphonate, polyphenylene oxide and dipropyl 2,3-dibromobutoxyethylphosphonate, etc. It is to be understood that the aforementioned compounds comprising a mixture of a polymer and an effective amount of a dialkyl ester of a halo-substituted alkyloxyalkylphosphonate are only representative of the class of compounds which may be prepared and that the present invention is not necessarily limited thereto.

It is also contemplated within the scope of this invention that the finished product of the type hereinbefore set forth, that is, a polymer and a dialkyl ester of a polyhalo-substituted alkyloxyalkylphosphonate may also contain a sufficient amount of a tin and/or an antimony compound which will act as a synergist for the flame retardant property of said finished compound by enhancing the desirable characteristic. Some specific examples of the tin and antimony compounds which may be used will include tin compounds in a tetravalent state such as tin dioxide, tin tetrachloride, methyl tin trichloride, ethyl tin trichloride, butyl tin trichloride, dipropyl tin dichloride, trimethyl tin chloride, methyl tin triacetate, dipropyl tin diacetate, diethyl tin dipropionate, diethyl tin dimaleate, dibutyl tin dimaleate, methyl tin trimaleate, dibenzyl tin dichloride, dimethyl tin sulfide, diethyl tin sulfide, dimethyl tin bis(methylmercaptide), dibutyl tin bis(octylmercaptide), diethoxy tin bis(ethylmercaptide), tin tetrakis(methylmercaptide), tin tetrakis(phenylmercaptide), diethyl tin mercaptoacetate, dioctyl tin mercaptoacetate, dihexyl tin mercaptopropionate, dimethyl tin mercaptobutyrate, dioctyl tin mercaptobutyrate, dilauryltin dithiobutyric acid ethyl ester, diethyl tin S,S' bis(3,5,5-trimethylhexyl mercaptoacetate), dibutyl tin S,S' bis(phenoxyethyl mercaptoacetate), dibutyl tin S,S' bis(diethylene glycol laurate mercaptoacetate), etc., antimony trioxide, antimony oxychloride, etc. It is to be understood that these compounds are only representative of the synergistic additives which may be admixed with the polymer and the phosphonate, and that the present invention is not necessarily limited thereto.

The following examples are given to illustrate the process of the present invention which, however, are not intended to limit the generally broad scope of the present invention in strict accordance therewith.

EXAMPLE I

A mixture consisting of 84.6 g. (0.6 mole) of 3-chloroallyloxymethyl chloride and 74.4 g. (0.6 mole) of trimethyl phosphite along with 8 g. of dimethylacetamide is heated at reflux temperature for a period of about 7 hours until the evolution of methyl chloride ceases. Following this the mixture is subjected to fractional distillation under reduced pressure and the desired product comprising dimethyl 3-chloroallyloxymethylphosphonate is recovered.

A solution of 42.9 g. (0.2 mole) of the dimethyl 3-chloroallyloxymethylphosphonate which is prepared according to the above paragraph in 60 cc. of carbon tetrachloride is heated to reflux and thereafter a solution of 32 g. (0.2 mole) of elemental bromine in an additional 40 cc. of carbon tetrachloride is slowly added dropwise to said refluxing solution. Upon completion of the addition of the bromine the solution is refluxed for an additional period of 5 hours, the completion of the reaction being signified by the disappearance of the bromine color. Following this the reaction mixture is subjected to fractional distillation to remove carbon tetrachloride solvent, the desired product comprising dimethyl 3-chloro-2,3-dibromopropoxymethylphosphonate being recovered therefrom.

EXAMPLE II

In similar manner a mixture of 84.6 g. (0.6 mole) of 3-chloroallyloxymethyl chloride and 99.6 g. (0.6 mole) of triethyl phosphite along with 10 g. of diethylformamide is heated to reflux for a period of 7 hours until the evolution of methyl chloride ceases. The resulting mixture is then subjected to fractional distillation under reduced pressure whereby the desired product comprising diethyl 3-chloroallyloxymethylphosphonate is thereby recovered. A solution of 48.5 g. (0.2 mole) of the diethyl 3-chloroallyloxymethylphosphonate and 60 cc. of carbon tetrachloride is heated to reflux, following which a solution of 32 g. (0.2 mole) of elemental bromine in an additional 40 cc. of carbon tetrachloride is slowly added dropwise to the refluxing solution. Upon completion of the addition of the bromine the solution is refluxed for an additional period of 5 hours, which completion of the reaction being signified by the disappearance of the bromine color. The reaction mixture is recovered and subjected to fractional distillation to remove the carbon tetrachloride solvent as well as unreacted starting material, the desired product comprising diethyl 3-chloro-2,3-dibromopropoxymethylphosphonate being separated and recovered.

EXAMPLE III

In this example 53.3 g. (0.5 mole) of allyloxymethyl chloride and 62.0 g. (0.5 mole) of trimethyl phosphite along with 8 g. of dimethylacetamide are placed in an appropriate apparatus provided with heating, stirring and reflux means. The solution is heated at reflux for a period of 6.5 hours and thereafter subjected to fractional distillation under reduced pressure. The desired product comprising dimethyl allyloxymethylphosphonate is thereafter recovered. Thereafter 36 g. (0.2 mole) of the dimethyl allyloxymethylphosphonate is dissolved in 60 cc. of carbon tetrachloride and heated to reflux. A solution of 32 g.

(0.2 mole) of elemental bromine in an additional 40 cc. of carbon tetrachloride is slowly added dropwise to the refluxing solution. Following the completion of the addition of the bromine heating is continued at reflux temperature for an additional period of 5 hours. At the end of this time the reaction mixture is subjected to fractional distillation to remove the solvent, unreacted starting material and undesired side reaction products, the desired product comprising dimethyl 2,3-dibromopropoxymethylphosphonate being recovered therefrom.

EXAMPLE IV

In this example a mixture consisting of 93.0 g. (0.6 mole) of 4-chlorobutenyloxymethyl chloride, 74.4 g. (0.6 mole) of trimethyl phosphite and 8 g. of dimethylformamide is heated to reflux temperature for a period of 7 hours. Upon completion of this reaction period the mixture is subjected to fractional distillation under reduced pressure and the desired intermediate compound comprising dimethyl 4-chlorobutenyloxymethylphosphonate is recovered. A portion comprising 45.7 g. (0.2 mole) of the dimethyl 4-chlorobutenyloxymethylphosphonate is added to 60 cc. of carbon tetrachloride and the resulting solution is then heated to reflux. Thereafter a solution of 32 g. (0.2 mole) of elemental bromine which is in an additional 40 cc. of carbon tetrachloride is slowly added dropwise to the refluxing solution. Reflux is thereafter continued for an additional period of 6 hours, the completion of the reaction, as in the above examples, being signified by the disappearance of the bromine color. Thereafter the reaction mixture is subjected to fractional distillation whereby the desired product comprising dimethyl 4-chloro-3,4-dibromobutyloxymethylphosphonate is recovered.

EXAMPLE V

The reaction set forth in example III above is repeated, the difference being that 60.3 g. (0.5 mole) of allyloxyethyl chloride is reacted with 62 g. (0.5 mole) of trimethyl phosphite. The desired product which is recovered by fractional distillation comprises dimethyl allyloxyethylphosphonate. This product is then treated with elemental bromine also in a manner similar to that set forth in example III above whereby, in fractional distillation under reduced pressure to remove the carbon tetrachloride solvent, the desired product comprising dimethyl 2,3-dibromopropoxyethylphosphonate is recovered.

EXAMPLE VI

A polyester is prepared in a conventional manner by admixing 1 mole of maleic anhydride, 1 mole of phthalic anhydride, and 2 moles of propylene glycol to a final temperature of 195°C. The resultant mixture is admixed with styrene, following which the resultant polyester is divided into two portions. To one portion of the polyester is added a sufficient amount of the compound prepared according to example I above, that is, dimethyl 3-chloro-2,3-dibromopropoxymethylphosphonate, so that the finished polyester contains 15 percent of the phosphonate. The two portions are then each treated with a catalyst and poured into molds following which the casts are cured in an air oven for 1 hour at a temperature of 75°C. and for 1 hour at 150°C. In order to determine the fire retardancy of the ester containing the phosphonate the casts are burned in an apparatus similar to that described by C. P. Fennimore and J. F. Martin in the November, 1966 issue of Modern Plastics. The cast which consists only of the polyester has an oxygen index (the lowest mole fraction of oxygen sufficient to maintain combustion) of $n = 0.187$. In contrast to this the oxygen index of the polyester cast which contains the dimethyl 3-chloro-2,3-dibromopropoxymethylphosphonate has an oxygen index greatly in excess of this number.

EXAMPLE VII

In this example polyethylene is milled with dimethyl 3-chloro-2,3-dibromopropoxymethylphosphonate which is prepared according to the precess set forth in example II above so that the finished product will contain 15 percent by weight of the phosphonate. Thereafter the resulting compound comprising the polyethylene and the diethyl 3-chloro-2,3-dibromopropoxymethylphosphonate is pressing into sheets which contain a glass cloth in the center of the sheet to prevent drooping during the combustion. Likewise, a commercial polypropylene formulation, per se, is milled and also pressed into sheets of similar configuration. Strips are cut from these sheets and then subjected to a flammability test similar in nature to that described in example VI above. The results of these tests discloses the fact that the oxygen index of the polyethylene containing the phosphonate diester is greatly in excess over the oxygen index of the untreated polyethylene. In addition, it is also found that the rate of burning of the treated polyethylene is much slower that that which is exhibited by the untreated polyethylene.

EXAMPLE VIII

In this example a commercial acrylonitrile-butadiene-styrene formulation (ABS) is admixed with a sufficient amount of dimethyl 2,3-dibromopropoxymethylphosphonate so that the finished product will contain 15 percent by weight of the phosphonate. The mixture is then extruded as rods having a diameter of 0.5 cm. In addition, another rod of similar diameter is prepared which contains only the commercial ABS formulation. The rods are then burned in a flammability test utilizing the apparatus described in the aforesaid November, 1966 issue of Modern Plastics magazine. The rod which contains only the commercial ABS formulation has an oxygen index of 0.183 while the oxygen index of the ABS formulation containing the phosphonate has greatly in excess of this number.

EXAMPLE IX

A commercial polyethylene oxide is milled, pressed into a sheet and then cut into a strip similar in nature to that described in example VII above. Another strip is prepared by admixing polyethylene oxide and dimethyl 2,3-dibromopropoxyethylphosphonate in an amount so that the finished polymer contains 15 percent of the phosphonate compound. Following this the untreated and treated strips of polyethylene oxide are subjected to a flammability test utilizing an apparatus similar to that referred to in example VI above. The oxygen index of the untreated polyethylene oxide is 0.150 while the oxygen index of the mixture of polyethylene oxide and phosphonate compound is substantially in excess of this number and, in addition, possesses a much slower burning rate than that of the untreated polyethylene oxide.

EXAMPLE X

In this example a commercial polypropylene is milled with diethyl 3-chloro-2,3-dibromopropoxymethylphosphonate in a manner similar to that described in example VII, the finished product containing 15 percent by weight of the phosphonate. This compound is then formed into a strip which contains a glass cloth in the center thereof to prevent dripping during the combustion test. A second strip consisting of only polypropylene is also prepared and thereafter both strips are subjected to the flammability test referred to in example VI above. The oxygen index of the strip which contains only polypropylene is 0.181 while the strip which consists of a mixture of the polypropylene and the phosphonate compound possesses a greater than average oxygen index and also exhibits a burning rate which is far slower than the strip which contains no flame retardant.

I claim as my invention:

1. A composition of matter comprising a diester of a halo-substituted alkyloxyalkylphosphonate having the formula:

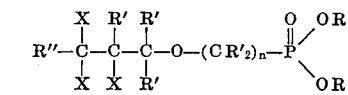

in which R is an alkyl radical of from one to about five carbon atoms, R' and R'' are independently selected from the group consisting of hydrogen, halogen, lower alkyl of from one to five carbon atoms, and cycloalkyl, aryl, aralkyl, and alkaryl compounds containing up to seven carbon atoms and halogenated derivatives thereof, $n$ is an integer of from 1 to 5, and X is hydrogen or halogen atoms, at least two of X being halogen atoms.

2. The novel composition of matter in claim 1 being dimethyl 3-chloro-2,3-dibromopropoxymethylphosphonate.

3. The novel composition of matter in claim 1 being diethyl 3-chloro-2,3-dibromopropoxymethylphosphonate.

4. The novel composition of matter in claim 1 being dimethyl 2,3-dibromopropoxymethylphosphonate.

5. The novel composition of matter in claim 1 being dimethyl 2,3-dibromopropoxyethylphosphonate.

6. The novel composition of matter in claim 1 being dimethyl 4-chloro-3,4-dibromobutoxymethylphosphonate.

* * * * *